UNITED STATES PATENT OFFICE.

FRITZ BENDER, OF MÜHLHEIM, GERMANY, ASSIGNOR TO FARBWERK MÜHLHEIM, VORMALS A. LEONHARDT & CO., OF SAME PLACE.

GREEN DISAZO DYE.

SPECIFICATION forming part of Letters Patent No. 606,439, dated June 28, 1898.

Application filed December 23, 1897. Serial No. 663,239. (Specimens.) Patented in England October 14, 1895, No. 19,253, and in France July 21, 1896, No. 258,853.

*To all whom it may concern:*

Be it known that I, FRITZ BENDER, chemist, doctor of philosophy, residing at Mühlheim-on-the-Main, Grand Duchy of Hessen, Germany, have invented new and useful Improvements in the Manufacture of Green Disazo Dyes, of which the following is a specification, and for which patents have been obtained in France, No. 258,853, dated July 21, 1896, and in Great Britain, No. 19,253, dated October 14, 1895.

My invention relates to disazo coloring-matters dyeing unmordanted cotton in green shades and derived from 1.8 amidonaphthol 3.5 disulfo-acid B, described in my application for United States patent, Serial No. 663,041, filed December 22, 1897, (and prepared by sulfonating 1.8 amidonaphthol 3 monosulfo-acid, benzidin-azo-salicylic acid, or analogous compounds,) and a diazo compound.

When benzidin-azo-salicylic acid is used, one way to produce the green disazo coloring-matters is the following: The acid B is first combined with a diazo compound and then with benzidin-azo-salicylic acid. According to another method benzidin-azo-salicylic acid is first combined with the acid B, and the obtained mixed tetrazo coloring-matter is brought into reaction with a diazo compound. When phenol is used instead of salicylic acid, it is preferable to combine the acid B first with a diazo compound, then with benzidin, and to couple finally with phenol or cresol.

I shall give in the following examples for such different modes of operating:

Example 1: One molecular proportion of sulfanilic acid is diazotized in the usual way and then combined with one molecular proportion of the acid B in a watery solution rendered alkaline by carbonate of soda. A deep-red-colored solution is immediately obtained. After some standing a watery suspension of one molecular proportion (or, rather, a little more—say 1.5 molecular proportions) of benzidin-azo-salicylic acid (prepared, as is well known, from equimolecular proportions of tetrazodiphenyl and salicylic acid) is added in the cold and the alkaline liquid is agitated from time to time. After standing for about twenty-four hours the liquid is heated to boiling and the green coloring-matter is salted out with common salt. It can be purified by dissolving and precipitating again. The thus-obtained green coloring-matter has the following properties: It forms, when dried, a dark powder. It is soluble in water with a green color and scarcely soluble in spirit. The solution in concentrated sulfuric acid has a reddish-violet coloration and when diluted with water a violet precipitate is obtained.

The following modifications may be made in Example 1 without materially altering the nature of the invention, the result being likewise a dyestuff dyeing unmordanted cotton in green shades: Instead of benzidin, tolidin may be used. Salicylic acid may be substituted by cresotinic acid. The combination of the acid B with the diazo compound may be effected in a solution weakly acidulated by acetic acid. Instead of sulfanilic acid other amins may be employed, and I have especially and successfully tried my process with the diazo compounds of the following amins: anilin, tolui-din sulfo-acid, naphthylamin sulfo-acid, and nitranilin. In some cases it is advisable to facilitate the second combination by adding a little caustic-soda lye.

Example 2: One molecular proportion of benzidin-azo-salicylic acid is combined with one molecular proportion of the acid B in a watery solution rendered alkaline by carbonate of soda. When after some standing the formation of the mixed tetrazo coloring-matter (which dyes unmordanted cotton in dull-violet shades) is finished, one molecular proportion (or, rather, a little more—say 1.5 molecular proportions) of diazotized sulfanilic acid is added and the alkaline liquid is agitated from time to time. After standing for about twenty-four hours the liquid is heated to boiling and the green coloring-matter is salted out with common salt. It can be purified by dissolving and precipitating again. The thus-obtained green coloring-matter likewise forms when dried a dark powder. It is soluble in water with a green color and is scarcely soluble in spirit. The solution in concentrated sulfuric acid has a reddish-violet coloration, and when diluted with water a violet precipitate is obtained.

The following modifications may be made in Example 2 without materially altering the nature of the invention, the result being likewise a dyestuff dyeing unmordanted cotton in green shades: Instead of benzidin tolidin may be used. Salicylic acid may be substituted by cresotinic acid. The combination of benzidin-azo-salicylic acid with the acid B may be effected in a solution weakly acidulated by acetic acid. Instead of sulfanilic acid other amins may be employed, and I have especially and successfully tried my process with the diazo compounds of the following amins: anilin, toluidin sulfo-acid, naphthylamin sulfo-acid, and nitranilin.

Example 3: One molecular proportion of sulfanilic acid is diazotized and combined with one molecular proportion of the acid B in a watery solution rendered alkaline by carbonate of soda. By adding to this alkaline solution about one molecular proportion of tetrazodiphenyl an intermediate product is quickly formed. When after some time neither tetrazodiphenyl nor any monoazo dye is unaltered, (which can be ascertained by diluting a sample with salt water and testing on filtering-paper,) one molecular proportion (or, better, a little more) of phenol dissolved in the calculated quantity of caustic-soda lye is added and the whole mass is stirred during some time until the formation of the green coloring-matter is finished. The liquid is then heated to boiling and the coloring-matter is salted out with common salt. The thus-obtained green coloring-matter likewise forms when dried a dark powder. It dissolves with a green color in water and is scarcely soluble in spirit. The solution in concentrated sulfuric acid has a violet coloration, and when diluted with water a violet precipitate is obtained.

The following modifications may be made in Example 3 without materially altering the nature of the invention, the result being likewise a dyestuff dyeing unmordanted cotton in green shades: Instead of benzidin tolidin may be used. Phenol may be substituted by cresol. Instead of sulfanilic acid other amins, such as above mentioned, may be employed. Further, the combination of the acid B with the diazo compound may be effected in a solution weakly acidulated by acetic acid.

Now what I claim, and desire to secure by Letters Patent, is the following:

The new coloring-matter derived from 1.8 amidonaphthol 3.5 disulfo-acid, forming when dried a dark powder, dissolving in water with a green color, being scarcely soluble in spirit, giving with concentrated sulfuric acid a violet solution, which when diluted with water yields a violet precipitate; said coloring-matter dyeing unmordanted cotton in green shades.

In testimony whereof I have signed my name to this specification in the presence of two subscribing witnesses.

FRITZ BENDER.

Witnesses:
FRIEDRICH QUEHL,
REINHOLD KIND.